(12) United States Patent
Rose

(10) Patent No.: US 11,482,881 B2
(45) Date of Patent: Oct. 25, 2022

(54) EMERGENCY POWER FOR A FACILITY

(71) Applicant: Electronic Controls, Inc., Cape Canaveral, FL (US)

(72) Inventor: Michael Rose, Orange City, FL (US)

(73) Assignee: Electronic Controls, Inc., Cape Canaveral, FL (US)

( * ) Notice: Subject to any disclaimer, the term of this patent is extended or adjusted under 35 U.S.C. 154(b) by 225 days.

(21) Appl. No.: 16/845,274

(22) Filed: Apr. 10, 2020

(65) Prior Publication Data

US 2021/0320521 A1  Oct. 14, 2021

(51) Int. Cl.
*H02J 9/06* (2006.01)
*H02J 7/02* (2016.01)
*H02M 7/219* (2006.01)
*H02M 7/5387* (2007.01)
*H02M 7/5395* (2006.01)

(52) U.S. Cl.
CPC ............ *H02J 9/062* (2013.01); *H02J 7/02* (2013.01); *H02M 7/219* (2013.01); *H02M 7/5387* (2013.01); *H02M 7/5395* (2013.01); *H02J 2207/20* (2020.01); *H02J 2310/20* (2020.01)

(58) Field of Classification Search
None
See application file for complete search history.

(56) References Cited

U.S. PATENT DOCUMENTS

| 8,192,039 | B1 | 6/2012 | Moe et al. | |
| 8,558,407 | B2 | 10/2013 | Mandy et al. | |
| 9,035,494 | B2 | 5/2015 | Mandy et al. | |
| 10,527,242 | B1 | 1/2020 | Tylicki et al. | |
| 2012/0112547 | A1* | 5/2012 | Ghosh | H02J 9/062 307/66 |
| 2014/0209415 | A1* | 7/2014 | Hall | H02J 9/061 187/290 |
| 2017/0104365 | A1* | 4/2017 | Ghosh | H02M 1/4241 |
| 2020/0006980 | A1* | 1/2020 | Tolakanahalli | H02M 3/33507 |
| 2021/0253050 | A1* | 8/2021 | Kambara | H02J 7/1423 |

* cited by examiner

Primary Examiner — Rexford N Barnie
Assistant Examiner — Terrence R Willoughby
(74) Attorney, Agent, or Firm — Bradley Arant Boult Cummings LLP

(57) ABSTRACT

A power supply circuit for powering components of a facility are disclosed. The power supply circuit may include a power transformer, a power input terminal, a power output terminal, a bridge, a relay, and a control circuit. The relay is connected between the power input terminal and the power output terminal. A primary side of the power transformer is coupled between the relay and the power output terminal. The bridge is coupled to the secondary side of the power transformer. In a normal power mode, the control circuit closes the relay and operates the bridge as a rectifier. In an emergency power mode, the control circuit opens the relay and operates the bridge as a pulse width modulator. In this manner, the bridge and the power transformer can be used both to charge a battery during normal operation and generate emergency AC power from the battery.

20 Claims, 6 Drawing Sheets

EMERGENCY POWER FOR A FACILITY

FIELD OF THE DISCLOSURE

This disclosure relates generally to power supply circuits that provide to components in a facility with emergency power during a power outage from an electric grid, including the components of an elevator.

BACKGROUND

Facilities, such as commercial and residential buildings and manufacturing complexes are normally powered by power from an electrical grid. Unfortunately, electrical grids can experience power outages and certain components in these facilities need to remain powered. Elevators in these facilities are particularly vulnerable to power outages since without power, they can leave individuals in a precarious and dangerous situation. Thus, elevators generally have emergency power supplies that allow the components of the elevator, such as the elevator lights and alarms, to operate in case the power in the building has an interruption. Generally, emergency power comes from a battery that must be charged from the electrical grid during normal operation. One of the problems with this is that separate circuitry is often needed to charge the battery during normal operation and then to power the components of the elevator with battery power during emergency situations. This is often expensive and requires bulky space consuming electronics. The separate circuitry also requires sophisticated coordination since the separate circuitry must be turned on and off in the different modes without interfering with one another and without damaging external components.

U.S. Pat. No. 10,527,242 is directed to an apparatus that provides backup power from a battery to a lighting device. The apparatus generates a supply signal that is provided to a first set of light emitting diodes (LEDs) and a second set of LEDs of a lighting device. A subset of the first set of LEDs can correspond to backup LEDs that are connected to a backup battery of the lighting device. A back up power supply is utilized to provide power from the battery to the backup LEDs when normal power is unavailable. A backup battery charging circuit of the lighting device is used to charge the backup battery. As such, the system utilizes separate and independent circuitry to charge the battery (i.e., the backup power supply) and provide emergency power from the battery (i.e., the backup battery charging circuit).

U.S. Pat. No. 9,035,494 discloses an elevator interior illumination assembly that includes a primary LED driver that provides conditioned DC power to primary and backup LEDs when AC power is available from a primary electric power source. The backup LEDs receive DC power from a backup LED driver when AC power is not available to the primary LED driver. A battery charger provides a DC charging voltage across terminals of the one or more batteries of the backup power source during normal operation. As such, the system utilizes separate and independent circuitry to charge the backup power source (i.e., the battery charger) and provide emergency power from the backup power source (i.e., the backup LED driver).

U.S. Pat. No. 8,192,039 discloses an LED backup controller operable to select a backup driver that receives power from a battery to supply electrical energy to a set of LEDs in response to power failure of a primary power source. When the LED backup controller determines that the battery is not fully charged or charged to a predetermined or preferred level, a battery charger is selected to provide electrical energy to charge the battery via a charging conduit. As such, the system utilizes separate and independent circuitry to charge the backup power source (i.e., the battery charger) and provide emergency power from the backup power source (i.e., the backup driver).

U.S. Pat. No. 8,558,407 discloses an elevator emergency LED lighting power supply assembly for providing backup power to one or more LED lamps of an elevator interior illumination system. The system includes a battery and an inverter connected to and configured to receive DC power from the battery and to output AC backup power to an elevator lighting system during a power outage. Additionally, the system includes a separate and independent charger to charge the battery. As such, the system utilizes separate and independent circuitry to charge the battery (i.e., the charger) and provide emergency power from the battery (i.e., the inverter).

Thus, what is needed are power circuits with more efficient configurations. These power circuits should provide various functions with regards to the battery in order to avoid having to provide multiple power circuits for different functions.

SUMMARY

Embodiments of a power supply circuit for powering at least one component in a facility are disclosed. The specific embodiments discussed in this disclosure are directed to the components of an elevator. However, it should be understood that embodiments of the power supply circuit can be provided to power any of the components of a facility during a power outage of an electrical grid and are considered to be within the scope of this disclosure.

In one embodiment, the power supply circuit includes a power transformer, a power input terminal, a power output terminal, a bridge, a relay, and a control circuit. The relay is connected between the power input terminal and the power output terminal while the primary side of the power transformer is coupled between the relay and the power output terminal. The bridge is coupled to the secondary side of the power transformer. In a normal power mode, the control circuit closes the relay and operates the bridge as a rectifier. As such, the power transformer and the bridge can be used to charge a battery. In an emergency power mode, the control circuit opens the relay and operates the bridge as a pulse width modulator. As such, the power transformer and the bridge are used to create an AC power signal from the power provided by the battery.

In this manner, the bridge and the power transformer are utilized to both charge the battery in the normal power mode and to generate AC power in the emergency power mode.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Figure 1:
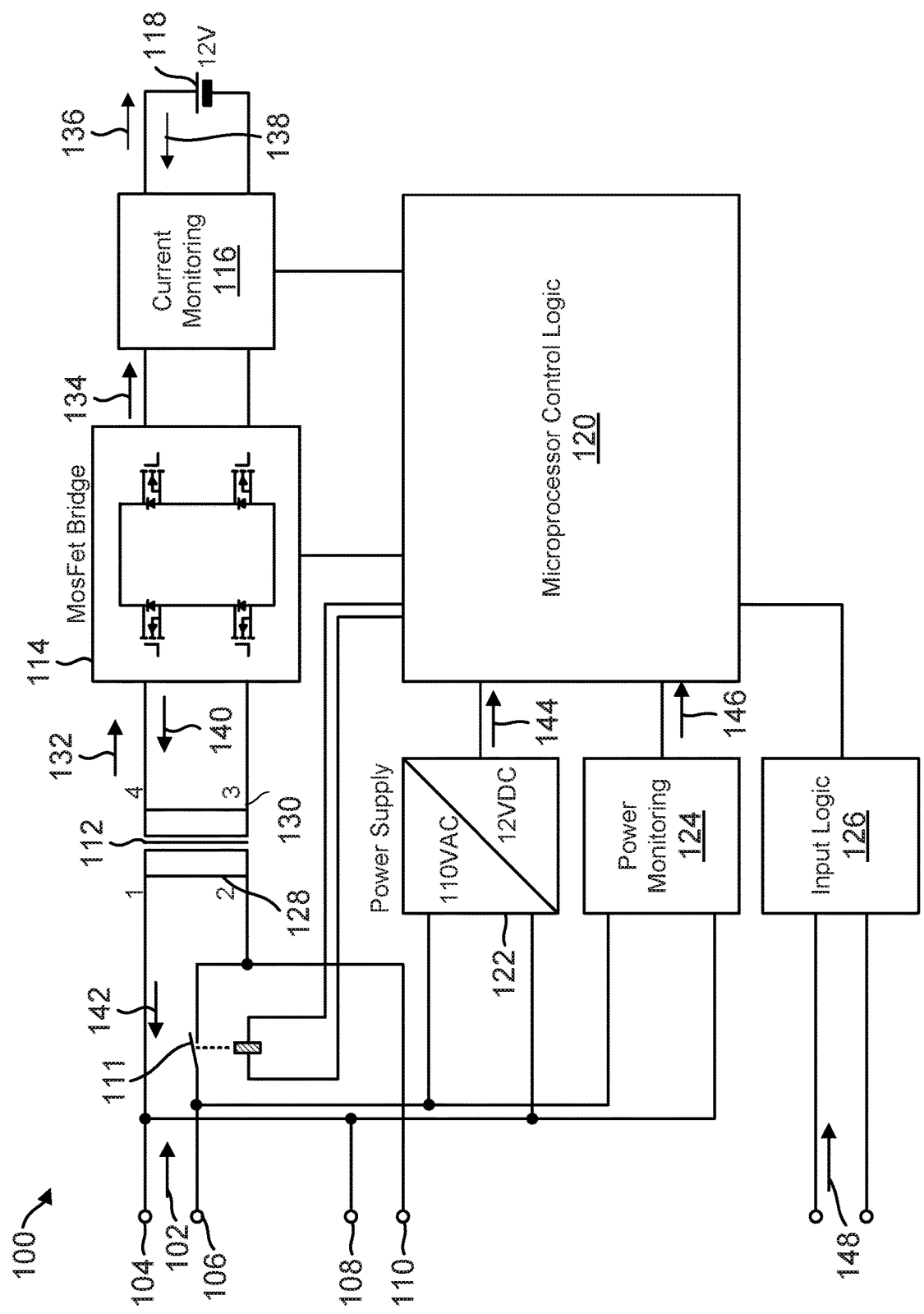
FIG. 1 illustrates one embodiment of a power supply circuit for powering at least one component in an elevator.

FIG. 1 illustrates one embodiment of a power supply circuit 100 for powering at least one component in a facility. This particular embodiment of the power supply circuit 100 is used to power the components of an elevator. However, the characteristics of the power supply circuit 100 may be modified so as to power any of the components of a facility, including escalators, facility lighting, security components, facility equipment, and/or the like.

The power supply circuit 100 operates in a normal power mode and in an emergency power mode. As explained below, in the normal power mode, the power supply circuit receives an AC power signal 102 at power input terminals 104, 106 and delivers the AC power signal 102 to power output terminal 108, 110. In this embodiment, the AC power signal 102 is a 110 Volt (V) alternating current (AC) power signal that operates at 60 Hz. However, in alternative embodiments, the AC power signal 102 may be provided at other voltage amplitudes and at other frequencies, depending on the design of the elevator. For example, the AC power signal 102 may also be a 230 V AC power signal that operates at 50 kHz for European applications. The power supply circuit 100 may be utilized to power the lights, fan, and/or other components of the elevator.

In addition to the power input terminal 104, 106 and the power output terminals 108, 110, the power supply circuit 100 includes a relay 111, a power transformer 112, a bridge 114, a current monitoring circuit 116, a battery 118, a control circuit 120, a control circuit power supply 122, a power monitoring circuit 124, and input logic 126 for a standby mode. The relay 111 is connected between the power input terminal 106 and the power output terminal 110 and is configured to be opened and to be closed. When the relay 111 is closed, the AC power signal 102 can flow between the power input terminal 106 and the power output terminal 110. However, when the relay is opened, the AC power signal 102 can no longer flow between the power input terminal 106 and the power output terminal 110. Accordingly, in this aspect, the AC power signal 102 is isolated and cannot pass between the power input terminals 104, 106 and the power output terminals 110, 112.

The control circuit 120 is configured to close the relay 111 in the normal power mode and to open the relay 111 in the emergency power mode. Thus, the components of the elevator are powered by the AC power signal 102 in the normal power mode. However, as explained in further detail below, the components of the elevator are powered from power from the battery 118.

As shown in FIG. 1, the power transformer 112 has a primary side 128 and a secondary side 130. The power transformer 112 is a step-down transformer from the primary side 128 to the secondary side 130. As such, the power transformer 112 provides higher voltages and lower currents on the primary side 128 and lower voltages and higher currents on the secondary side 130. The power input terminal 104 is connected directly to the top of the primary side 128 and to the power output terminal 108. The bottom of the primary side 128 is connected between the relay 111 and the power output terminal 110.

Thus, when the control circuit 120 is operating in the normal power mode, the relay 111 is closed and the AC power signal 102 is received at the primary side 102 of the power transformer 112. In this embodiment, the power transformer 112 steps down the voltage amplitude so as to generate a stepped down AC power signal 132 on the secondary side 130. For example, the stepped down AC power signal 132 may have a voltage amplitude of 5V as a result of the power transformer 112. As would be appreciated by a person of ordinary skill in the art, the step-down characteristics of the power transformer 112 will depend on the characteristics of the battery 118. The stepped down AC power signal 132 is received by the bridge 114. In this example, the bridge 114 has an H-bridge configuration.

The control circuit 120 is configured to operate the bridge 114 as a rectifier in the normal power mode. In this manner, the stepped down AC power signal 132 is converted into a rectified AC power signal 134. In this embodiment, the current monitoring circuit 116 has a built-in low pass filter. The rectified AC power signal 134 is thus converted into a direct current (DC) charging signal 136 that charges the battery 118 in the normal power mode. The control circuit 120 operates the bridge 114 to provide a boost in the voltage so that the DC charging signal 136 is provided at a DC voltage level, which in this example is a DC voltage level of 12V. However, in alternative embodiments, the characteristics of the power transformer 112 may be provided so that the DC voltage level is any desired DC voltage level, such as for example 24V. The current monitoring circuit 116 is configured to allow the control circuit 120 to monitor the DC charging signal 136 to determine the amount of charge current to provide to the battery 118.

In the emergency power mode, the control circuit 120 is configured to open the relay 111 and cut off external power. As such, the AC power signal 102 can no longer flow to the power output terminals 108, 110 and to the primary side 128 of the power transformer 112. Instead, a DC power signal 138 is generated by the battery 118, which is received by the bridge 114. The control circuit 120 is configured to operate the bridge 114 as a pulse width modulator in the emergency power mode. As such, the bridge 114 generates a pulse width modulated signal 140 at the secondary side 130 of the power transformer 112. The power transformer 112 is configured to step up the voltage amplitude and to provide low pass filtering from the secondary side 130 to the primary side 120. As such, the pulse width modulated signal 140 is converted into an AC power signal 142 at the primary side 128 of the power transformer 112 when the relay 111 is open. The AC power signal 142 has a voltage amplitude of 110V and a frequency of 60 Hz. The AC power signal 142 is provided at the power output terminals 108, 110 in the emergency power mode so as to power the components of the elevator. The AC power signal 142 may be generated as ("approximately") a pure sine wave and thus the AC power signal 142 can power electrical fans, incandescent and fluorescent light bulbs, elevator fans, LED lights, and/or the like. In alternative embodiments, the AC power signal 142 may be generated as any other acceptable and regularly repeating AC power signal (depending on the particular error tolerances and/or required electronic characteristics of the application) such as a square wave or a 3-step sine wave.

Accordingly, the power transformer 112 is used in the normal power mode to charge the battery 118 and then in the emergency power mode to generate the AC power signal 142 from the DC power signal 138 generated by the battery 118. In the normal power mode, power flows from the power input terminals 104, 106, then from the primary side 128 to the secondary side 130 of the power transformer 112, then through the bridge 114, then to the battery 118. In the emergency power mode, power flows from the battery 118 through the bridge 114, then from the secondary side 130 to the primary side 128 of the power transformer 112 and then to the power output terminals 108, 110.

To power the control circuit 120, the power supply circuit 100 includes the control circuit power supply 122 that is configured to power the control circuit 120. A more detailed example of the control circuit power supply 122 is provided below. In this embodiment, the control circuit power supply 122 is configured to convert the AC power signal 102 into a DC power signal 144 during the normal power mode. In this particular example, the DC power signal 144 has a voltage level of 12V. On the other hand, in the emergency power mode, the control circuit 120 is powered by the DC power signal 138 from the battery 118.

The power supply circuit 100 includes the power monitoring circuit 124, which is configured to generate a sensing signal 146. The sensing signal 146 has a voltage level that is provided to the control circuit 120. The power monitoring circuit 124 is configured to generate the sensing signal 146 such that the voltage level of the sensing signal 146 indicates the voltage amplitude of the AC power signal 102 and so that the voltage level of the sensing signal 146 can be measured by the control circuit 120. By detecting the voltage level of the sensing signal 146, the control circuit 120 detects the voltage amplitude of the AC power signal 102.

The control circuit 120 is configured to detect when the AC power signal 102 has a voltage amplitude above a first threshold voltage amplitude and operates in the normal power mode in response to the AC power signal 102 having the voltage amplitude above the first threshold voltage amplitude. The first threshold voltage amplitude should be around 90% of the nominal line voltage. For a nominal line voltage of 110V, the first threshold voltage amplitude is 100 V. Thus, once AC power signal 102 is above 100V the control circuit 120 closes the relay 111 so that the battery 118 is charged by the AC power signal 102. The AC power signal 102 will thus power the components of the elevator.

On the other hand, the control circuit 120 is configured to detect when the AC power signal 102 has a voltage amplitude below a second threshold voltage amplitude. The control circuit 120 is configured to operate in the emergency power mode in response to the AC power signal 102 having the voltage amplitude below the second threshold voltage amplitude. The second threshold voltage amplitude is lower than the first threshold voltage amplitude. In this example, the second threshold voltage amplitude is 90V. Thus, once the AC power signal 102 drops below 90V, the control circuit 120 is configured to open the relay 111 and utilize power from the battery 118 to power the components of the elevator.

With regard to standby operation, a standby signal 148 is provided to the input logic 126. The input logic 126 is configured to indicate to the control circuit 120 when the elevator is not in use. The control circuit 120 shuts off the elevator and the components of the elevator when the elevator is not in use.

Figure 2:
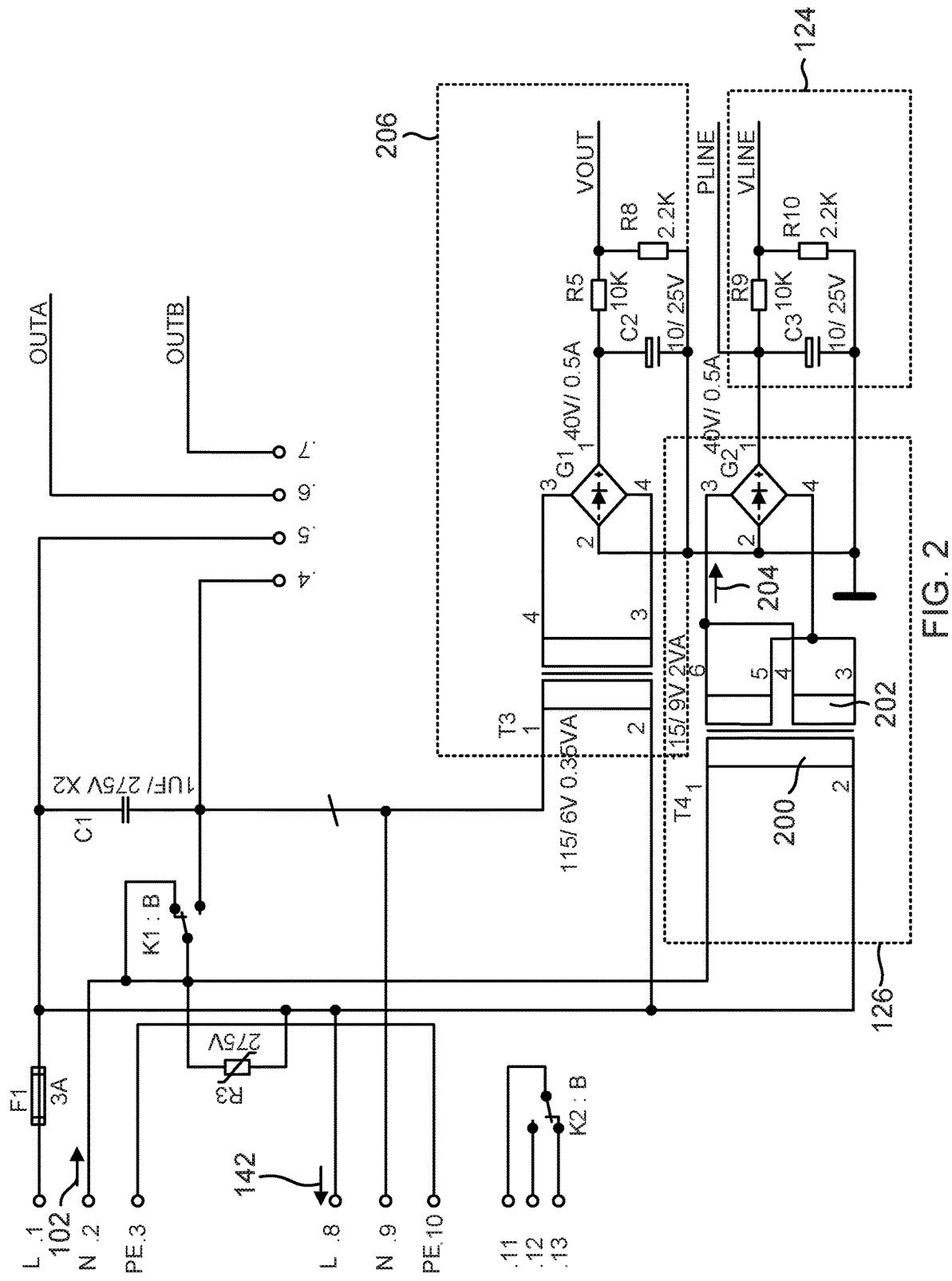
FIG. 2 illustrates one embodiment of power input terminals, the power output terminals, a relay, a control circuit power supply, and a power monitoring circuit.

FIG. 2 illustrates one embodiment of the power input terminal 104, 106, the power output terminal 108, 110, the relay 111, the control circuit power supply 122, and the power monitoring circuit 124. Power input terminals 104, 106 are provided as terminal 1 and terminal 2, respectively, in FIG. 2. The power output terminals 108, 110 are provided as terminal 8 and terminal 9 respectively in FIG. 2. The relay 111 from FIG. 1 is shown as the relay K1 in FIG. 2. The power transformer 112 (See FIG. 1—not shown in FIG. 2) is connected to the primary side 128 at terminal 3 and at terminal 4 and on the secondary side 130 at terminal 8 and at terminal 9. The capacitor C1 is connected between terminals 3 and 4 and thus in parallel with the primary side 128 of the power transformer 112. The capacitor C1 is used in the emergency power mode so as to assist in providing low pass filtering to the AC power signal 142 when the battery 118 (not shown in FIG. 2) is providing power.

The control circuit power supply 122 includes a power transformer T4, a bridge rectifier G2, and a capacitor C3 that is coupled in shunt. The power transformer T4 has a primary side 200 and a secondary side 202. The power transformer T4 is configured to receive the AC power signal 102 and generate an AC power signal 204 stepped down to a voltage amplitude of 9 Volts. The bridge G2 and the capacitor C2 are then configured to generate the DC power signal PLINE at 12 Volts, which is the DC power signal 144 in FIG. 1. The DC power signal PLINE is provided to power the control circuit 120. Thus, the control circuit power supply 122 is an AC to DC converter.

The power monitoring circuit 124 is provided by the resistors R9 and R10. The resistor R10 is coupled in shunt and in parallel with the capacitor C2 while the resistor R9 is connected in series between the capacitor C2 and the resistor R10. The power monitoring circuit 124 steps down the DC power signal PLINE to generate the sensing signal VLINE, which is the sensing signal 146 in FIG. 1. The sensing signal VLINE is used by the microcontroller 500 (See FIG. 5) to determine whether the AC power signal 102 has a voltage amplitude at or above a first threshold voltage (e.g., 110V) and at or below a second threshold voltage (e.g., 90V).

Figure 3A:
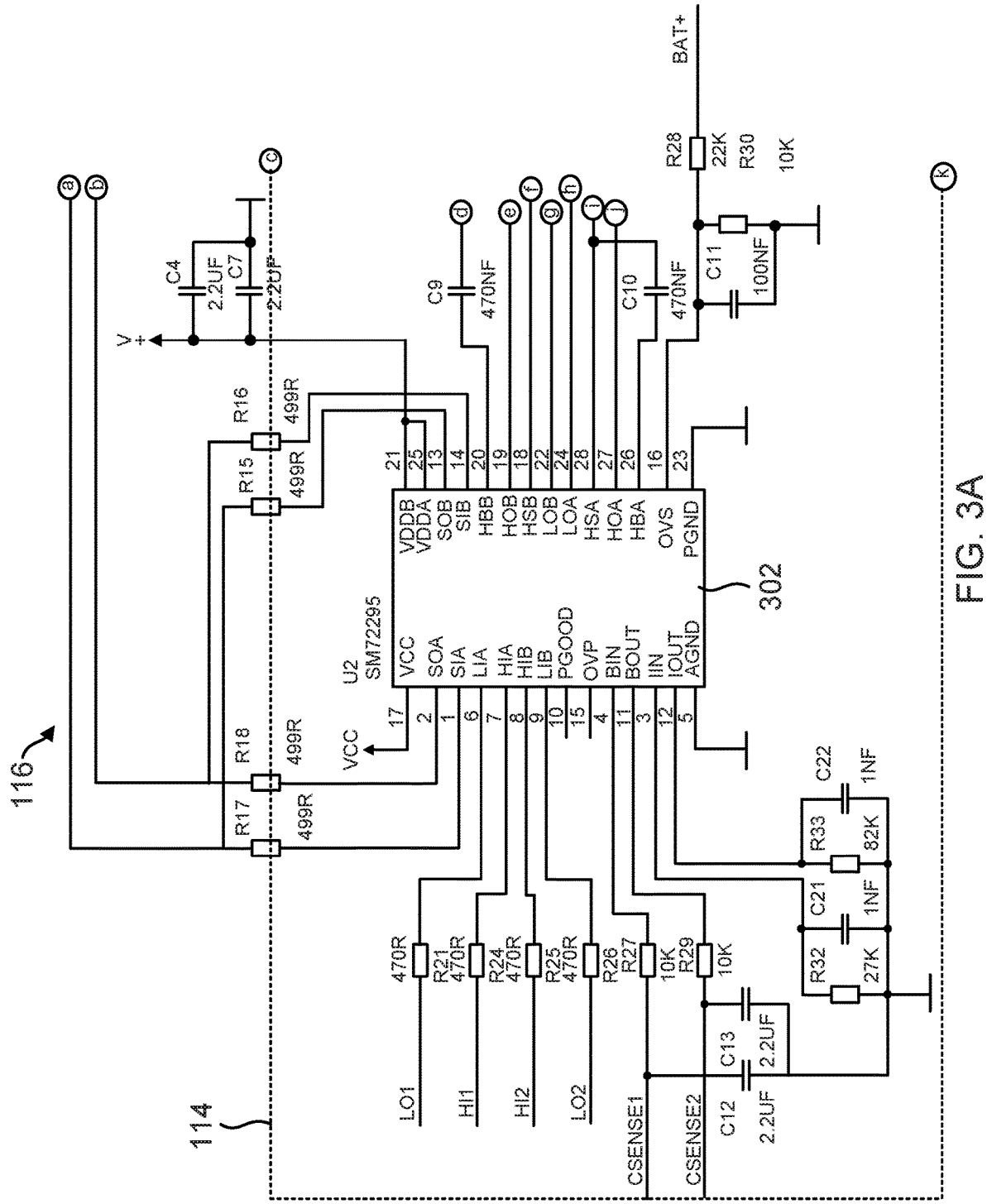
FIG. 3A and FIG. 3B one embodiment of a bridge and a low pass filter.
Figure 3B:
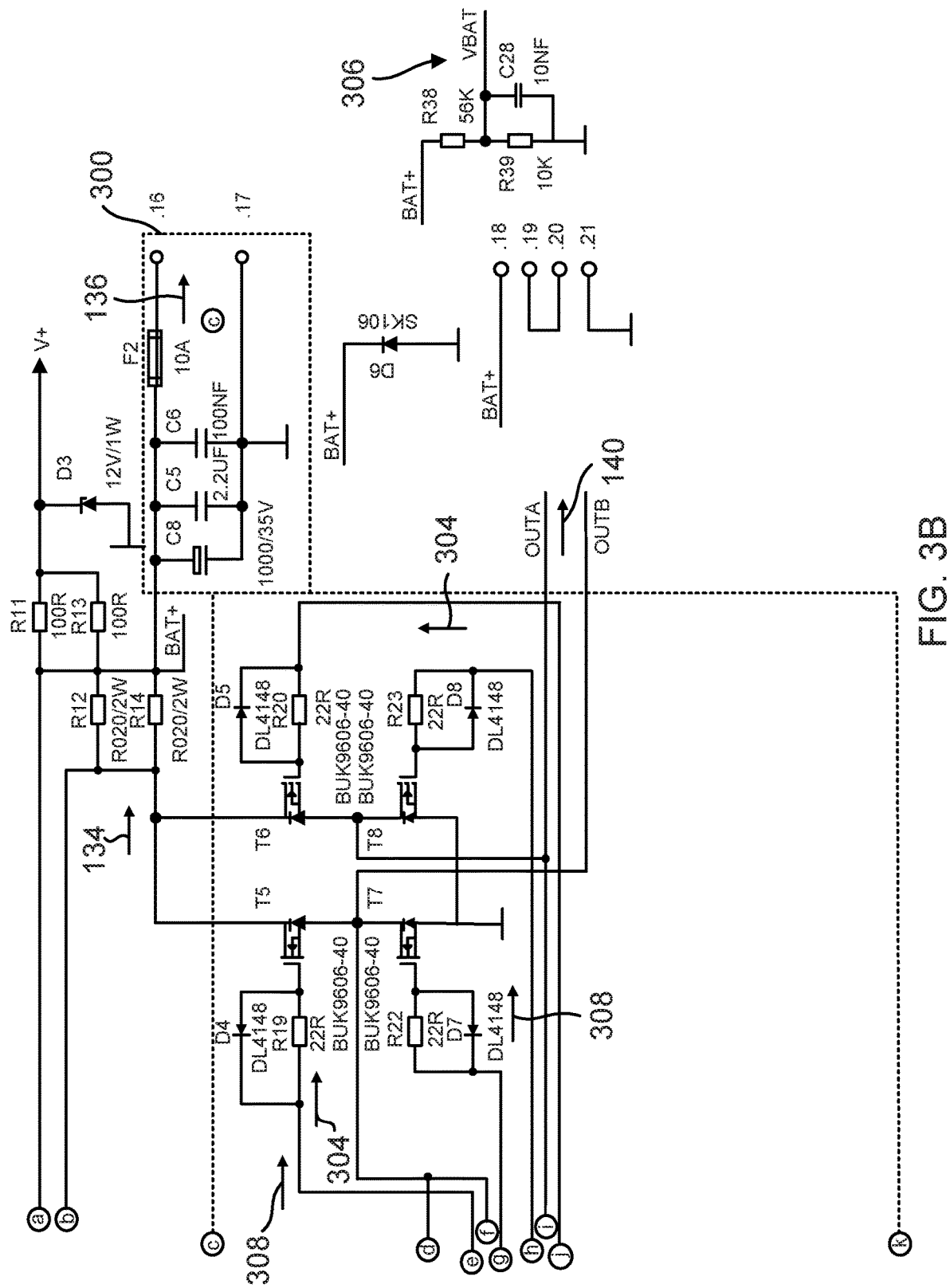

FIG. 3A and FIG. 3B illustrate an embodiment of the bridge 114 and a low pass filter 300. The battery 118 (shown in FIG. 1) is connected at terminal 16 and terminal 17. The bridge 114 is formed by four transistors T5, T6, T7, T8, which are provided in an H-bridge configuration. In this example, each of the transistors T5, T6, T7, T8 in the bridge 114 is a MOSFET. However, other types of transistors may be used. Also shown in FIG. 3A is a gate driver 302 that forms part of the control circuit 120. During the normal power mode, the gate driver 302 is configured to generate a 20 kHz pulse width modulated (PWM) signal 304 that operates between a first voltage level (e.g., Vcc) and a second voltage level (e.g., ground). The transistors T7, T8 are configured to be turned on in response to the PWM signal 304 being at the first voltage level while the transistors T5, T6 are configured to be turned off in response to the PWM signal 304 being at the first voltage level. As such, a short is created on the secondary side 130 (See FIG. 1) of the power transformer 112 and energy is stored in the power transformer 112. The transistors T7, T8 are configured to be turned off in response to the PWM signal 304 being at the second voltage level while the transistors T5, T6 are configured to be turned on in response to the PWM signal 304 being at the second voltage level. Accordingly, energy is released from the secondary side of the power transformer 112 and is sent to the battery 118. In this manner, the bridge 114 operates as a rectifier in the normal operating mode so as to generate the rectified AC power signal 134. The low pass filter 300 is configured filter high frequency components from the rectified AC power signal 134 to generate the DC charging signal 136 received at the terminals 16, 17. The DC charging signal 136 is used to charge the battery 118.

The voltage monitoring circuit 306 is attached to terminal 16 in order to provide a sensing signal VBat that has a voltage level that is set in accordance with the voltage level of the battery 118. In this example, the voltage monitoring circuit 306 is formed by the resistor R38, the resistor R39, and the capacitor C28. The resistor R38 is 10 kOhms and is provided in series at the input. The resistor R39 and the capacitor C28 are connected in parallel and in shunt. The resistor R39 and the capacitor C28 are connected between the resistor R38 and an output of the voltage monitoring circuit 306. The resistor R39 is 10 kOhms while the capacitor C28 has a capacitance of 10 nanofarads. The sensing signal VBat is provided as a feedback signal to a microcontroller 500 (See FIG. 5) in the control circuit 120, where the microcontroller 500 is configured to activate a fault relay K2 (See FIG. 2) when the battery voltage gets too low or too high and stop charging the battery 118. The contacts of the relay K2 are available at terminals 11, 12, 13 (See FIG. 2) and are wired to the control circuit 120 so as to report a battery fault.

The current monitoring circuit 116 is attached to terminal 16 in order to provide sensing signals SIA, SOA that has a voltage level that is set in accordance with the current level of the DC charging signal 136. The gate driver 302 has 2 transconductance amplifiers to measure current going into and coming out of the battery 118. Resistors R12 and R14 are current sensing resistors while resistors R15, R16, R17, and R18 feed the voltage drop across resistors R12 and R14 into the transconductance amplifiers in the gate driver 302. Resistors R32 and R33 are the load resistors of the transconductance amplifiers that translate the sensing signals into voltages. The gate driver 302 is configured to generate current measurement signals CSENSE1, CSENSE2 that indicate the current level of the DC charging current 136. Two noise filters, one with capacitor C12 and resistor R27 and another with capacitor C13 and resistor R29 filter out high frequency noise from the current measurement signals CSENSE1, CSENSE2.

During the emergency power mode, the gate driver 302 is configured to generate a 20 kHz carrier signal 308 that operates all of the transistors T5, T6, T7, T8. The transistors T5, T6, T7, T8 operate as a pulse width modulator. A microcontroller 500 (See FIG. 5) in the control circuit 120 is configured to provide a 60 Hz signal that is modulated onto the pulse width modulated signal 140 generated by the bridge at the secondary side 130 of the power transformer 112. The power transformer 112 and the capacitor C1 (see FIG. 1) generate the AC power signal 142 that powers the components of the elevator during the emergency mode.

Also shown in FIG. 2 is a voltage feedback circuit 206 that includes the power transformer 208, the bridge G1, the capacitor C2, the resistor R5, and the resistor R8. The voltage feedback circuit 206 is configured to generate a voltage feedback signal Vout that has a DC voltage level that is set in accordance with the voltage amplitude of the AC power signal 142. In this manner, the control circuit 120 can regulate the modulation depth to achieve the desired output voltage.

Figure 4:
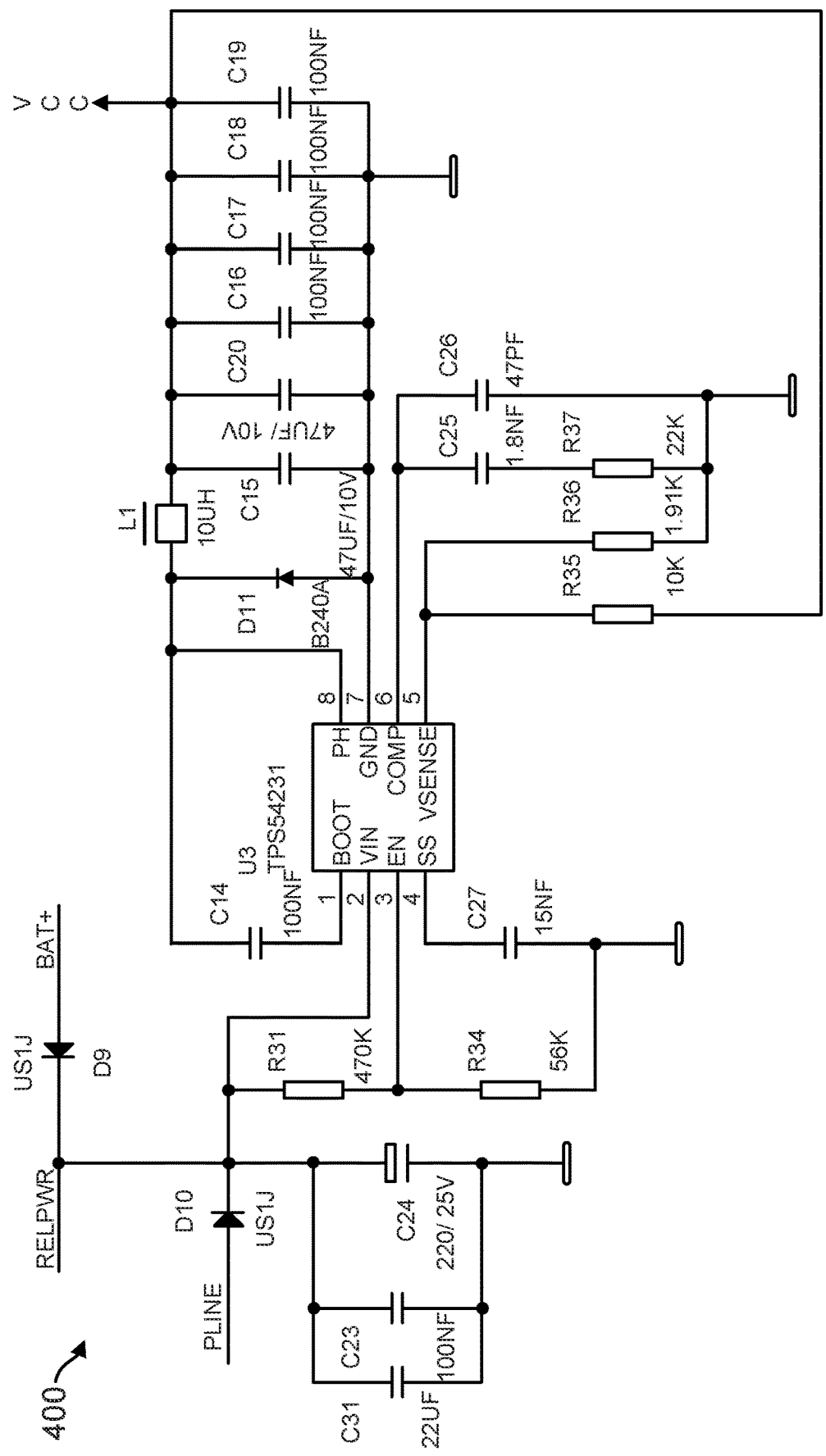
FIG. 4 illustrates one embodiment of a DC to DC step down converter.

Referring now to FIG. 4, FIG. 4 illustrates one embodiment of a DC to DC step down converter 400, which may be utilized to control power in the control circuit 120. During the normal power mode, the DC to DC step down converter 400 is configured to receive the DC power signal PLINE from the control circuit power supply 122. In the emergency power mode, the DC to DC step down converter 400 is configured to receive the DC power signal VBat+ from the battery 118, which is the DC power signal 138 in FIG. 1. Both are 12V DC signals. The DC to DC converter 400 is configured to generate a DC supply signal Vcc from the DC power signal PLINE in the normal power mode. However, in the emergency power mode, the DC to DC converter 400 is configured to generate the DC supply signal Vcc from the DC power signal Vbat+.

The DC to DC step down converter 400 has a switch mode converter U3 that runs at a frequency of 570 kHz. The rectifier D11, the series connected inductor L1, and shunt connected capacitors C15, C16, C17, C18, C19, and C20 provide low pass filtering that provides a low noise DC supply signal Vcc that is capable of powering the control circuit 120.

Figure 5:
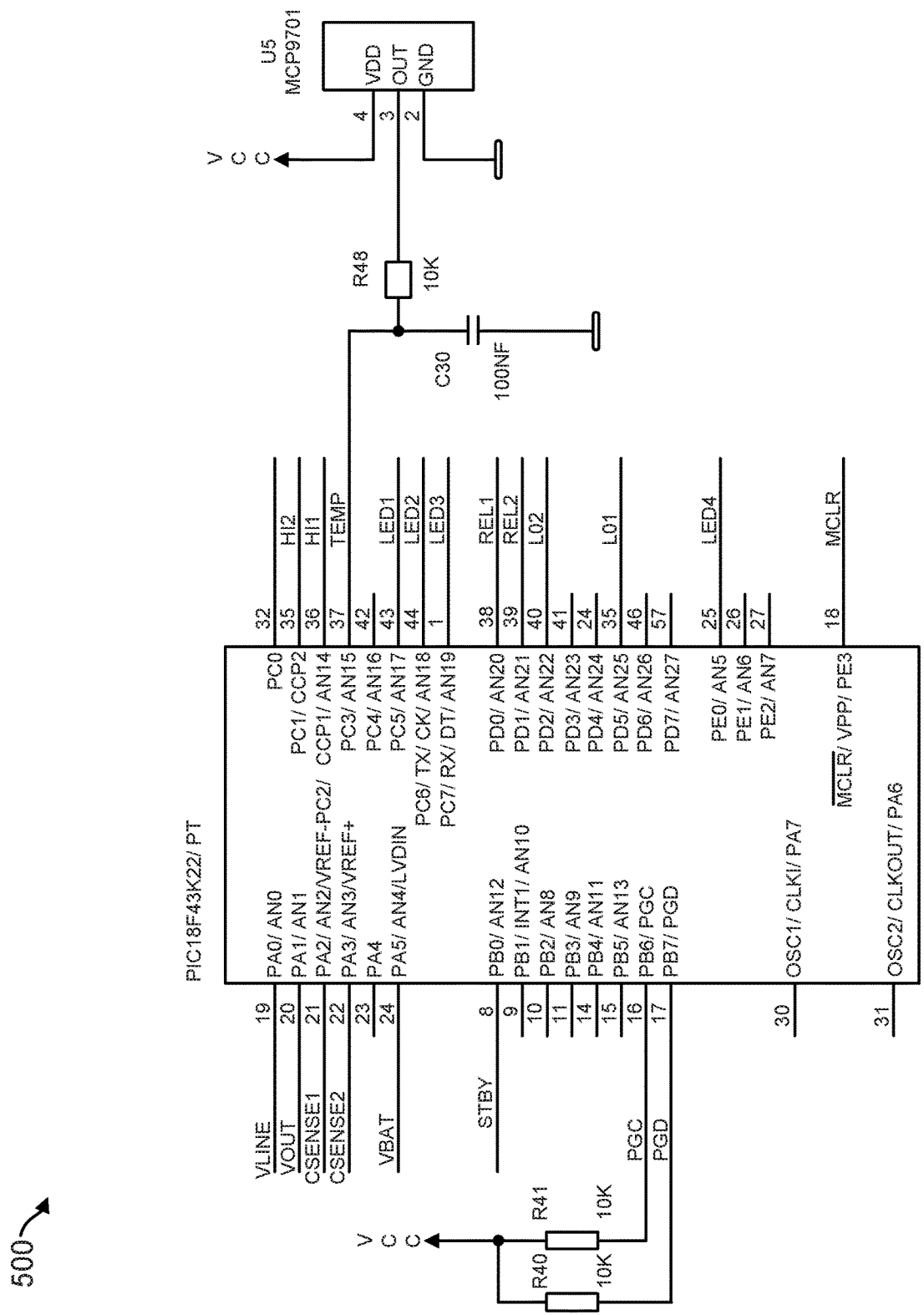
FIG. 5 illustrates one embodiment of a microcontroller.

FIG. 5 illustrates one embodiment of a microcontroller 500, which may be provided as part of the control circuit 120. The microcontroller 500 is configured to generate relay signals REL1, REL2, which operate the relays K1, K2 respectively. The microcontroller 500 is also configured to receive sensing signal VLINE and determine whether the AC power signal 102 has a voltage amplitude that is at or above a first threshold voltage (in the example above, 110V) and at or below a second threshold voltage (in the example above, 90V). If the AC power signal 102 is above the first threshold voltage, the microcontroller 500 operates in the normal operating mode so that the components of the elevator are powered by the AC power signal 102. On the other hand, if the AC power signal 102 is below the second threshold voltage, the microcontroller 500 operates in the emergency operating mode, so that battery power is utilized to power the components of the elevator. The microcontroller 500 generates the relay signal REL1 to operate the relay K1, as explained above.

The microcontroller 500 is also configured to receive the sensing signal VBat to detect a voltage level of the battery 118. If the voltage level of the battery 118 is too high or too low, the microcontroller 500 operates to turn off the DC charging signal 136 to the battery 118. The microcontroller 500 is also configured to receive current measurement signals CSENSE1, CSENSE2 that indicate the current coming into and going out of the battery 118. The microcontroller 500 is configured to regulate the charging and discharging of the battery 118 in accordance with the current measurement signals CSENSE1, CSENSE2. The relay signal REL2 is provided by the microcontroller 500 so as to trigger the relay K2 to prevent the battery 118 from being charged depending on the current measurements indicated by the current measurement signals CSENSE1, CSENSE2. The microcontroller 500 is also configured to receive the voltage feedback signal Vout that has a DC voltage level that is set in accordance with the voltage amplitude of the AC power signal 142. In this manner, the microcontroller 500 is configured to regulate the modulation depth and control the voltage amplitude of the AC power signal 142. Finally, the microcontroller 500 is also configured to control the operation of the gate driver 302 so that the gate driver 302 operates in the normal operating mode or in the emergency operating mode, as explained above.

With regard to the embodiments described above with respect to FIG. 1-5, the embodiments are specifically configured to provide emergency power to the components of an elevators. However, embodiments may be provided to power any of the components in a facility. The characteristics of the embodiments may be modified so as to power any of the components of a facility, including escalators, facility lighting, security components, facility equipment, and/or the like.

Those skilled in the art will recognize improvements and modification to the preferred embodiments of the present disclosure. All such improvements and modifications are considered within the scope of the concepts disclosed herein and the claims that follow.

What is claimed is:

1. A power supply circuit for powering at least one component in an elevator, comprising:
    a power transformer having a primary side and a secondary side;
    a first power input terminal;
    a first power output terminal;
    a bridge coupled to the secondary side of the power transformer;
    a relay connected between the first power input terminal and the first power output terminal, wherein the primary side of the power transformer is coupled between the relay and the first power output terminal;
    a control circuit configured to operate in a first power mode and a second power mode, wherein the control circuit is operably associated with the bridge and is configured to:
        close the relay in the first power mode;
        operate the bridge as a rectifier in the first power mode;
        open the relay in the second power mode;
        operate the bridge as a pulse width modulator in the second power mode;
    a battery coupled to the bridge; and
    a low pass filter coupled between the secondary side of the power transformer and the battery, wherein:
        the first power input terminal is configured to receive an AC power signal;
        the power transformer is configured to receive the AC power signal at the primary side from the first power input terminal and generate a stepped down AC power signal at the secondary side when the relay is closed;
        the control circuit is configured to operate the bridge as a rectifier in the first power mode such that the bridge and the low pass filter generate a DC charging signal that charges the battery in the first power mode.

2. The power supply circuit of claim 1, wherein the battery is configured to generate a DC power signal at the bridge in the secondary power mode.

3. The power supply circuit of claim 1, wherein the relay is configured such that the AC power signal is received at the first power output terminal when the relay is closed.

4. The power supply circuit of claim 1, wherein:
    the battery is configured to generate a DC power signal at the bridge in the secondary power mode;
    the control circuit is configured to operate the bridge as a pulse width modulator in the second power mode such that bridge and the power transformer generate a second AC power signal at the primary side of the power transformer when the relay is open.

5. The power supply circuit of claim 4, wherein the relay is configured such that the second AC power signal is received at the first power output terminal when the relay is open.

6. The power supply circuit of claim 1, wherein the first power input terminal is configured to receive an AC power signal and wherein the control circuit is configured to:
    detect when the AC power signal has a voltage amplitude above a first threshold voltage amplitude;
    operate in the first power mode in response to the AC power signal having the voltage amplitude above the first threshold voltage amplitude;
    detect when the AC power signal has the voltage amplitude below a second threshold voltage amplitude, wherein the second threshold voltage amplitude is lower than the first threshold voltage amplitude;
    operate in the second power mode in response to the AC power signal having the voltage amplitude below the second threshold voltage amplitude.

7. The power supply circuit of claim 1, further comprising a control circuit power supply configured to power the control circuit.

8. The power supply circuit of claim 1, wherein the bridge comprises an H-bridge having a first pair of transistors and a second pair of transistors, wherein:
    the first pair of transistors are coupled to the secondary side of the power transformer so that the secondary side of the power transformer is energized when the first pair of transistors are turned on;
    the second pair of transistors are coupled to the secondary side of the power transformer so that the secondary side releases energy when the second pair of transistors is turned on.

9. The power supply circuit of claim 8, wherein the control circuit is configured to generate a Pulse Width Modulation (PWM) signal that operates between a first voltage level and a second voltage level during the first power mode, wherein:
    the first pair of transistors are configured to be turned on in response to the PWM signal being at the first voltage level;
    the second pair of transistors are configured to be turned off in response to the PWM signal being at the first voltage level;
    the first pair of transistors are configured to be turned off in response to the PWM signal being at the second voltage level; and
    the second pair of transistors are configured to be turned on in response to the PWM signal being at the second voltage level.

10. The power supply circuit of claim 9, further comprising a second battery configured to generate a DC supply signal in the second power mode, wherein the control circuit is configured to:
    operate the first pair of transistors and the second pair of transistor in accordance to a carrier signal;
    modulate an AC signal at the secondary side of the power transformer, wherein the carrier signal has a first frequency and the AC signal has a second frequency, wherein the first frequency is higher than the second frequency.

11. A power supply circuit for powering at least one component in an elevator, comprising:
    a power transformer having a primary side and a secondary side;
    a first power input terminal;
    a first power output terminal;

a bridge coupled to the secondary side of the power transformer;

a relay connected between the first power input terminal and the first power output terminal, wherein the primary side of the power transformer is coupled between the relay and the first power output terminal;

a control circuit configured to operate in a first power mode and a second power mode, wherein the control circuit is operably associated with the bridge and is configured to:

close the relay in the first power mode;
operate the bridge as a rectifier in the first power mode;
open the relay in the second power mode;
operate the bridge as a pulse width modulator in the second power mode; and a control circuit power supply configured to power the control circuit;

wherein the control circuit power supply comprises a first AC to DC converter and a DC to DC step down converter, wherein:

the first power input terminal is configured to receive an AC power signal;
the AC to DC converter is configured to receive the AC power signal through the relay in the first power mode and to generate a first DC supply signal from the AC power signal in the first power mode;
the DC to DC converter is configured to generate a second DC supply signal from the first DC supply signal in the first power mode.

12. The power supply circuit of claim 11, wherein the control circuit is configured to be power by the second DC supply signal.

13. The power supply circuit of claim 11, further comprising a battery configured to generate a third DC supply signal in the second power mode wherein:

the AC to DC converter is coupled to the relay such that the AC to DC converter is blocked from receiving the AC power signal in the second power mode; and
the DC to DC converter is configured to generate the second DC supply signal from the third DC supply signal in the second power mode.

14. The power supply circuit of claim 13, wherein the DC to DC converter is configured to shut off in response to the third DC supply signal dropping below a threshold DC voltage level.

15. A method of powering components in an elevator, comprising:

receiving an AC power signal at a first power input terminal;
closing a relay in a first power mode, wherein the relay is connected between the first power input terminal and a first power output terminal, wherein the primary side of the power transformer is coupled between the relay and the first power output terminal;
charging a battery by operating a bridge coupled to a secondary side of the power transformer as a rectifier in the first power mode;
opening the relay in a second power mode;
generating an AC power signal using power from the battery by operating the bridge as a pulse width modulator in the second power mode;
detecting when the AC power signal has a voltage amplitude above a first threshold voltage amplitude;
operating in the first power mode in response to the AC power signal having the voltage amplitude above the first threshold voltage amplitude;
detecting when the AC power signal has the voltage amplitude below a second threshold voltage amplitude, wherein the second threshold voltage amplitude is lower than the first threshold voltage amplitude;
operating in the second power mode in response to the AC power signal having the voltage amplitude below the second threshold voltage amplitude.

16. The method of claim 15, wherein a gate driver operates the bridge in the first power mode and in the second power mode.

17. The method of claim 15, wherein operating the bridge in the first power mode comprises:

generating a Pulse Width Modulation (PWM) signal that operates between a first voltage level and a second voltage level during the first power mode, wherein:
turning on a first pair of transistors in the bridge in response to the PWM signal being at the first voltage level;
turning off a second pair of transistors in the bridge in response to the PWM signal being at the first voltage level;
turning off the first pair of transistors in the bridge in response to the PWM signal being at the second voltage level; and
turned on the second pair of transistors in the bridge in response to the PWM signal being at the second voltage level.

18. The method of claim 17, wherein operating the bridge in the second power mode comprises:

operating the first pair of transistors and the second pair of transistor in accordance to a carrier signal;
modulating an AC signal at the secondary side of the power transformer, wherein the carrier signal has a first frequency and the AC signal has a second frequency, wherein the first frequency is higher than the second frequency.

19. The method of claim 18, wherein a gate driver operates the bridge in the first power mode and in the second power mode.

20. The method of claim 19, wherein the gate driver has two transconductance amplifiers to measure current going into and coming out of the battery.

* * * * *